United States Patent
Host et al.

(10) Patent No.: US 10,138,781 B2
(45) Date of Patent: Nov. 27, 2018

(54) METHOD AND SYSTEM TO IMPROVE COLD-START CATALYST LIGHT-OFF

(71) Applicant: Ford Global Technologies, LLC, Dearborn, MI (US)

(72) Inventors: Ray Host, Mount Clemens, MI (US); Robert Andrew Wade, Plymouth, MI (US); Anthony Morelli, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/255,057

(22) Filed: Sep. 1, 2016

(65) Prior Publication Data
US 2018/0058288 A1    Mar. 1, 2018

(51) Int. Cl.
   *F02B 37/12* (2006.01)
   *F01N 3/20* (2006.01)

(52) U.S. Cl.
   CPC ............ *F01N 3/2006* (2013.01); *F02B 37/12* (2013.01); *F05B 2220/40* (2013.01)

(58) Field of Classification Search
   CPC ..... F01N 3/2006; F02B 37/12; F05B 2220/40
   USPC .......................................................... 60/602
   See application file for complete search history.

(56) References Cited

U.S. PATENT DOCUMENTS

| 3,179,210 | A | * | 4/1965 | Bozzola | ................. | F01D 21/006 |
| | | | | | | 184/6 |
| 3,203,514 | A | * | 8/1965 | Davies | .................... | F02B 39/14 |
| | | | | | | 123/196 R |
| 4,690,572 | A | | 9/1987 | Sasaki | | |
| 6,244,521 | B1 | | 6/2001 | Sesser | | |
| 6,846,053 | B2 | | 1/2005 | Salice | | |
| 2005/0175477 | A1 | | 8/2005 | Kopp et al. | | |
| 2005/0193715 | A1 | | 9/2005 | Dipper | | |
| 2006/0236692 | A1 | * | 10/2006 | Kolavennu | ........... | F01N 3/0807 |
| | | | | | | 60/602 |
| 2008/0190107 | A1 | * | 8/2008 | Ogiso | ..................... | F02D 23/02 |
| | | | | | | 60/602 |
| 2011/0107739 | A1 | * | 5/2011 | Shimizu | ................ | F01N 3/2006 |
| | | | | | | 60/273 |
| 2014/0067227 | A1 | * | 3/2014 | Byrd | ................... | F02D 41/0007 |
| | | | | | | 701/102 |
| 2014/0090373 | A1 | * | 4/2014 | Timmons | .............. | F02D 23/005 |
| | | | | | | 60/605.1 |
| 2015/0377158 | A1 | * | 12/2015 | Benjey | .................... | F02B 39/10 |
| | | | | | | 701/22 |
| 2016/0348719 | A1 | * | 12/2016 | Uneura | ................... | F16C 27/02 |

(Continued)

FOREIGN PATENT DOCUMENTS

| EP | 0392677 A1 | 10/1990 |
| EP | 1167755 A2 | 1/2002 |
| EP | 1998010 A2 | 12/2008 |

(Continued)

*Primary Examiner* — Jason Newton
(74) *Attorney, Agent, or Firm* — Julia Voutyras; McCoy Russell LLP

(57) ABSTRACT

Methods and systems are provided for expediting light-off of a catalyst during engine cold-start conditions by inhibiting rotation of the turbocharger shaft. In one example, a method may include inhibiting rotation of the turbocharger shaft during engine cold-start conditions until the catalyst is operating at a desired efficiency. The rotation of the shaft may be inhibited via either a passive or an active shaft locking mechanism.

14 Claims, 7 Drawing Sheets

(56) References Cited

U.S. PATENT DOCUMENTS

2018/0058288 A1\* 3/2018 Host ................... F01N 3/2006
2018/0066676 A1\* 3/2018 Castan ................ F04D 25/045

FOREIGN PATENT DOCUMENTS

FR        2925591 A1 \*  6/2009  ........... F01D 21/006
KR     20010059357 A  \*  7/2001  .............. F02B 39/14

\* cited by examiner

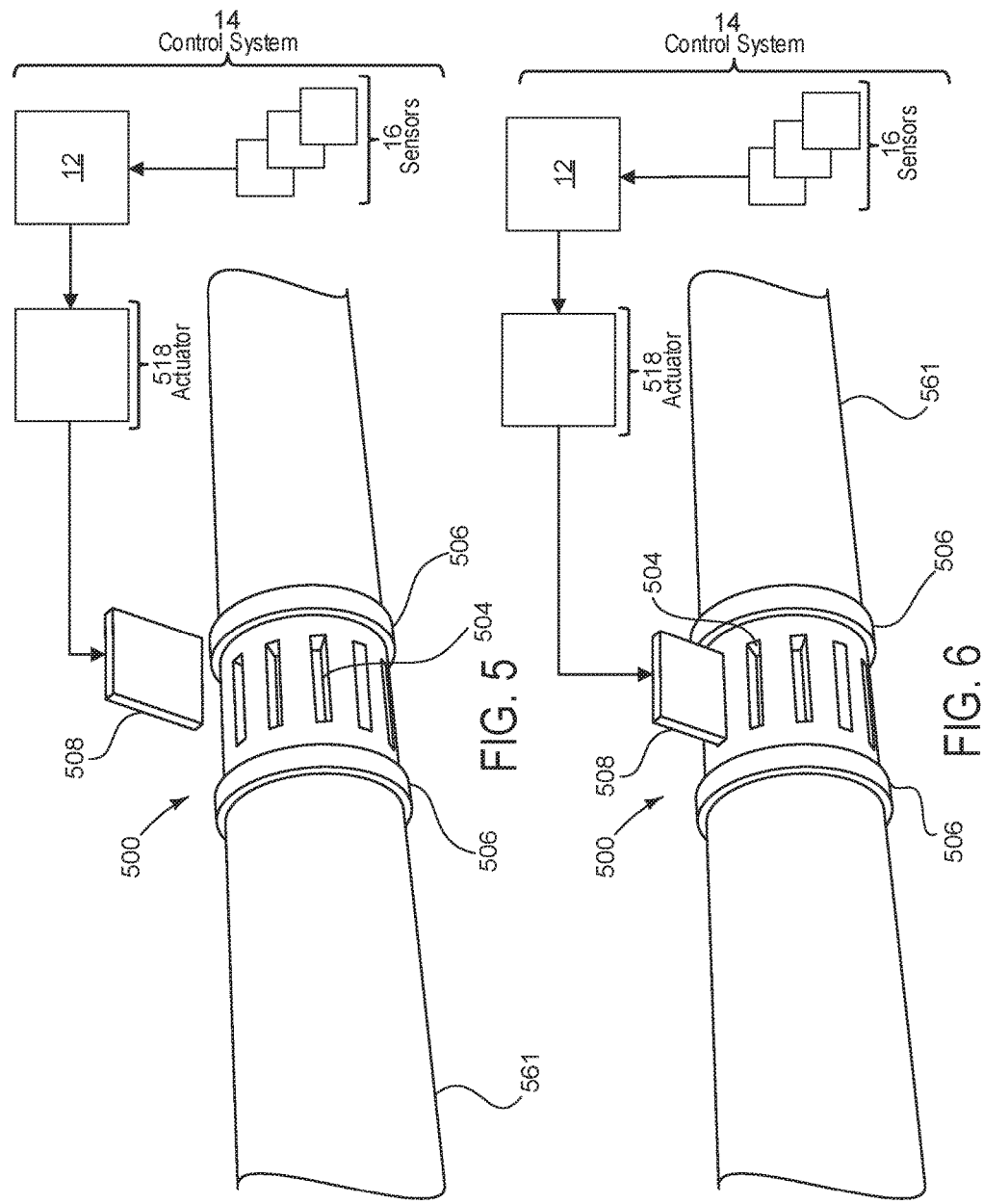

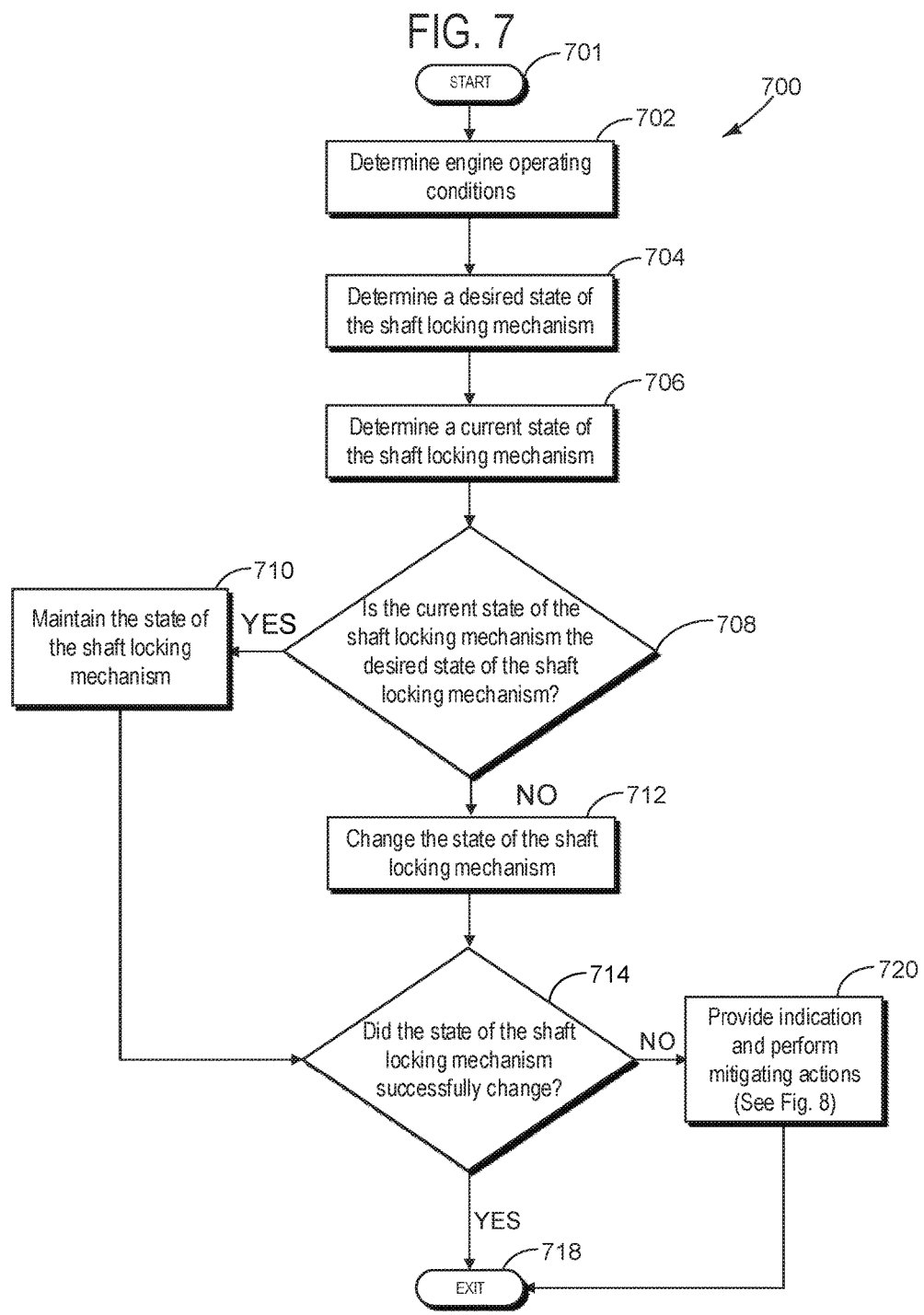

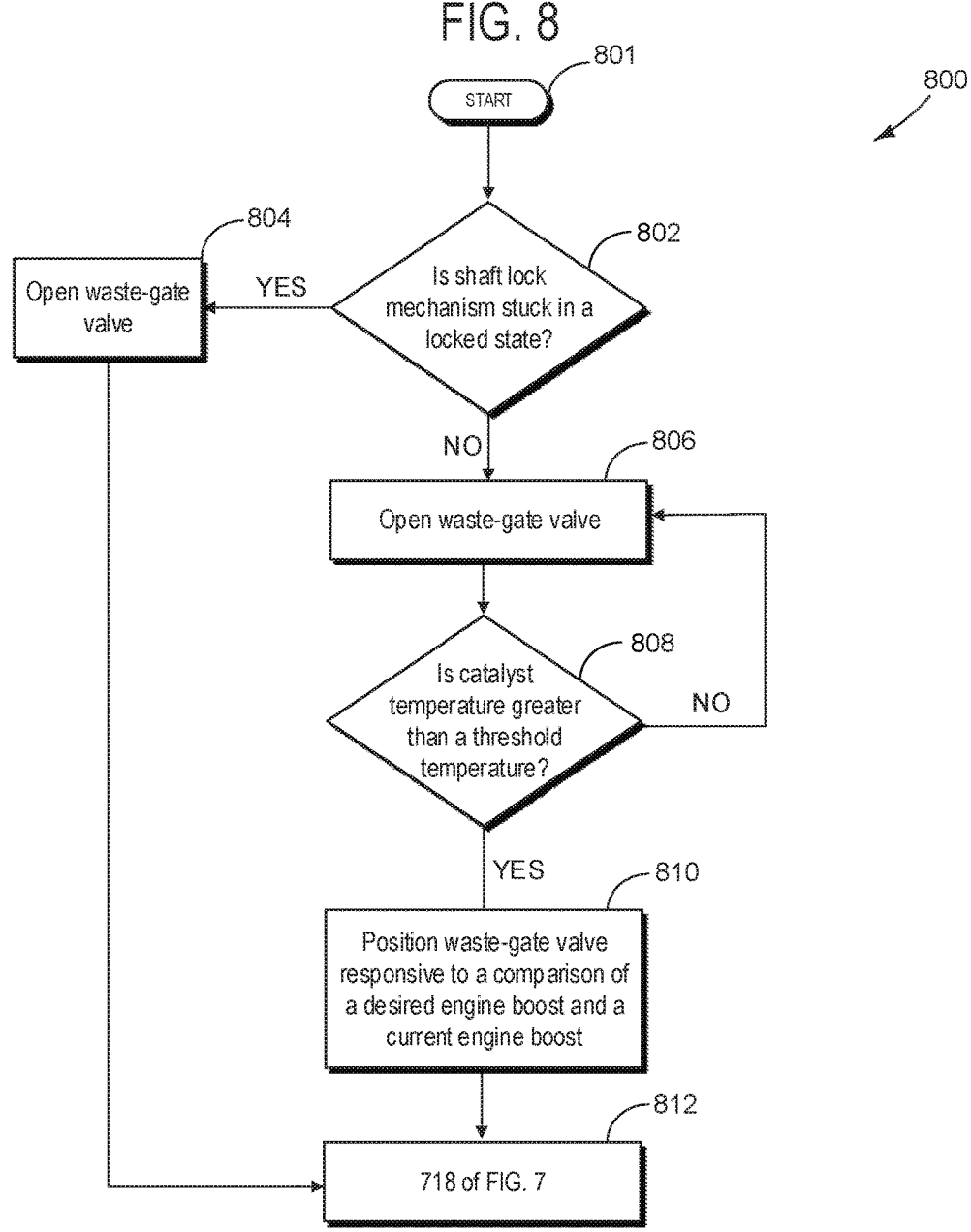

METHOD AND SYSTEM TO IMPROVE COLD-START CATALYST LIGHT-OFF

FIELD

The present description relates generally to methods and systems for controlling a turbocharger of a vehicle engine to expedite catalyst light-off during engine cold-start conditions.

BACKGROUND/SUMMARY

During engine emissions testing, an exhaust catalyst may be required to be reach a desired conversion efficiency within a predetermined time following an engine start from cooled-to-ambient conditions. For example, in some engine emissions testing, the exhaust catalyst may be required to operate at greater than 80% efficiency within 20 seconds following an engine start. Exhaust catalyst operating temperatures may begin to operate with such efficiency in temperature conditions ranging from approximately 800 to 1600 degrees Fahrenheit, depending on the composition catalyst. Thus, in order to increase the efficiency of an exhaust catalyst within a short period of time following an engine start, various operational strategies may be employed to heat the catalyst and expedite the light-off of the exhaust catalyst.

Attempts to address issues related to expediting the light-off of a catalyst following an engine start may include adjusting an ignition timing or an air to fuel ratio (AFR) of the engine to increase an exhaust gas temperature. However, the inventors have recognized that while adjusting ignition timing and AFR attempts to expedite catalyst light-off by increasing an exhaust gas temperature, these strategies may not sufficiently address heat loss of the exhaust gas to exhaust components.

The inventors have recognized that one source of heat loss for exhaust gas is due to a rotational rate of the exhaust gas increasing as it travels to the exhaust catalyst. The rotational rate of the exhaust gas increases downstream of a turbine in engines that include turbochargers due to free rotational movement of the turbine. This free rotational movement of the turbine causes a rotational rate of the exhaust gas to increase as the exhaust gas flows through the turbine to the exhaust catalyst. The increased rotation of the exhaust gas as the exhaust gas travels axially downstream towards the exhaust catalyst increases a travel time or residency time of the exhaust gas from the exhaust manifold to the exhaust catalyst. Thus, an amount of contact between the exhaust gas and the walls of the exhaust conduit is increased, and an increased amount of heat loss from the exhaust gas to the exhaust conduit may occur prior to the exhaust gas reaching the exhaust catalyst.

In one example, the issues described above may be addressed by a method that includes, responsive to engine cold-start conditions, inhibiting movement of a shaft of a turbocharger via a shaft locking mechanism. The shaft locking mechanism may be a passive or an active shaft locking mechanism. Using a shaft locking mechanism as opposed to relying only on waste-gate position alone to control rotation of the turbocharger may be advantageous. For example, a shaft locking mechanism may be more accurate in controlling a rotational speed of a turbocharger shaft and/or may have a greater impact on flow rotation than waste-gate adjustments. The shaft locking may be provided in place of, or in addition to, waste-gate adjustments, if available.

By inhibiting a rotation of the turbocharger, the technical effect of reducing a rotational rate of exhaust gas spiraling through the exhaust passage downstream of a turbine of the turbocharger may be achieved, and a heat loss of the exhaust gas may be reduced as the exhaust gas travels to the exhaust catalyst. This reduction in heat loss from the exhaust gas as it travels to the exhaust catalyst may expedite catalyst light-off and may lead to reduced emissions.

As mentioned above, the shaft locking mechanism may either be a passive shaft locking mechanism or an active shaft locking mechanism. A passive shaft locking mechanism may include a phase-transitioning material that stalls a turbocharger, or resists turbocharger rotation, when in a solid state. As a temperature of the phase-transitioning material increases, a viscosity of the phase-transitioning material may decrease. Once the viscosity of the phase-transitioning material decreases below a threshold viscosity, rotation of the turbocharger shaft may be enabled. A melting point temperature, as defined by substances included in the phase-transitioning material, of the phase-transitioning material may correspond to a temperature at which the catalyst may operate at a desired efficiency, in some examples. A passive shaft locking mechanism may be advantageous for withstanding the high temperature conditions of the turbocharger shaft without degradation.

An active shaft locking mechanism may include a pin that may be actuated to fit into a recess of the shaft locking mechanism to stall rotation of the shaft of the turbocharger. An active shaft locking mechanism may be advantageous for quickly stalling or enabling rotation of the turbocharger shaft responsive to certain conditions and varying the conditions, such as temperature, at which rotation is no longer blocked. For example, the shaft rotation may be stalled until precisely when it is desired to enable shaft rotation. In one example, an active shaft locking mechanism may enable the shaft to be stalled during engine cold-start conditions until reaching a first temperature to reduce exhaust gas rotation, leading to expedited catalyst light-off, but stalled until reaching a second, different (e.g., lower or higher) temperature during other starting conditions or engine re-starting conditions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows a view of the shaft locking mechanism according to a second embodiment in a first state.

FIG. 6 shows view of the shaft locking mechanism according to the second embodiment in a second state.

FIG. 7 shows a flowchart of an example method for operating a turbocharger system.

FIG. 8 shows a flowchart of an example method for performing mitigating actions for a turbocharger system.

FIGS. 2-6 are shown approximately to scale.

DETAILED DESCRIPTION

Figure 1:
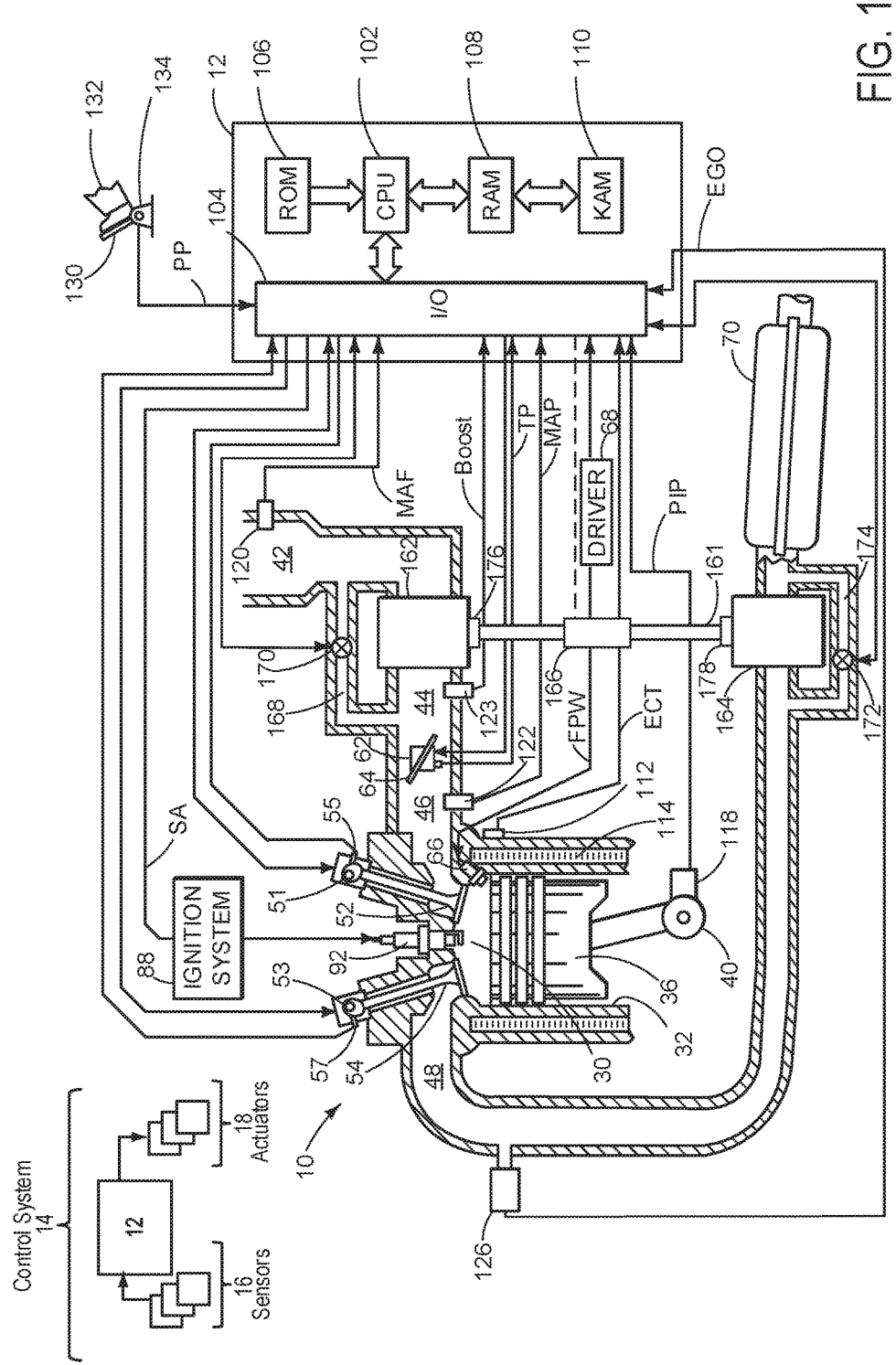
FIG. 1 shows a schematic diagram of an example engine in accordance with embodiments of the present disclosure.

The following description relates to systems and methods to improve a catalyst light-off during engine cold-start conditions in an engine system, such as the engine system of FIG. 1. Responsive to engine operating conditions, such as cold-start conditions, a shaft locking mechanism such as described in FIGS. 2-6 may be operated in a locked and an unlocked state. In some examples, the shaft locking mechanism may be positioned in a locked state to expedite catalyst light-off during cold-start conditions. The locked state of the shaft locking mechanism may expedite catalyst light-off by inhibiting rotation of a turbine of the turbocharger. Rotation of the turbine may create rotation in exhaust flow downstream of the turbine, and this rotation of the exhaust flow may lead to heat loss of the exhaust gas. In other examples, the shaft locking mechanism may be positioned in an unlocked state, enabling uninhibited rotation of the turbine. This unlocked state may be advantageous for meeting engine boost demands, in some examples. A controller of the engine system may be executable to perform a routine to control operation of the turbocharger during conditions where the shaft locking mechanism is operational and during conditions where the shaft locking mechanism may be degraded, such as the routines of FIGS. 7-8. The routines carried out by an engine system controller may be based on various relationships of the engine components, as described in FIG. 9.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width from controller 12. Fuel is delivered to fuel injector 66 by a fuel system (not shown) including a fuel tank, fuel pump, and fuel rail (not shown).

In addition, intake manifold 44 is shown communicating with turbocharger compressor 162. Shaft 161 mechanically couples turbocharger turbine 164 to turbocharger compressor 162. Exhaust gases spin turbine 164 which is coupled to compressor 162 via the shaft 161. However, in some examples, a waste-gate 172 may allow exhaust gases to bypass turbine 164 by redirecting exhaust gases through turbine bypass conduit 174. The spinning of the turbine 164 may cause the compressor 162 to spin, as the turbine and the compressor of the turbocharger are coupled via the shaft 161. As the compressor 162 spins, the compressor 162 may draw air from air intake 42 to supply intake boost chamber 46. However, a compressor bypass valve 165 may redirect intake air through a compressor bypass conduit 168 in some examples. The turbine bypass conduit 174 and the compressor bypass conduit 168 may be used to control a rotational speed of the turbine shaft 161 in combination with a shaft locking mechanism 166, some examples. In other embodiments, however, a compressor bypass conduit 168 and a turbine bypass conduit 174 may not be provided.

The turbocharger compressor 162, the shaft 161, the turbine 164, and the shaft locking mechanism 166 may be part of a turbocharger system. The turbocharger system may be a self-contained assembly that mounts to an exhaust component of the engine, and the turbocharger system may be contained within a turbocharger casing. Different types of turbocharger systems may be possible. For example, a single scroll turbocharger system or a twin scroll turbocharger system may be possible.

Rotation of the shaft 161 may be supported by first and second bearings 176 and 178. The bearings 176 and 178 that rotationally support the shaft 161 may be high speed bearings. In one example, the bearing 176 may surround the shaft 161 and may be positioned between the turbocharger compressor 162 and a shaft locking mechanism 166, for example. The bearing 178 may surround the shaft 161 and may be positioned between the turbocharger turbine 164 and the shaft locking mechanism 166. Though the bearings 176 and 178 are shown positioned on either end of the shaft, other positioning may be possible and additional bearings may be possible in order to provide further support for the rotation of the shaft 161.

Several different types of bearing configurations may be possible to rotationally support the shaft 161. For example, the bearings 176 and 178 may be semi-floating journal bearings with an oil hydraulic film, fully floating journal bearings with an oil hydraulic film, ball bearings pressed on the shaft 261 with an oil coating, ball bearings pressed on the shaft 261 with a sealed grease, needle bearings, or air bearings. In examples bearings where an oil coating or sealed grease are used, the oil coating or sealed grease provides lubrication to the bearings to prevent degradation of the bearings as well as to the turbocharger shaft 161.

Shaft 161 includes a shaft locking mechanism 166. In some examples, the shaft locking mechanism 166 may communicate with the controller 12. The shaft locking mechanism 166 may inhibit a rotation of the shaft 161 responsive to engine operating conditions. For example, responsive to engine operating conditions, the controller 12 may actuate actuators of the shaft locking mechanism 166 in order to inhibit or enable rotation of shaft 161. In other examples, the shaft locking mechanism 166 may inhibit or enable rotation of the shaft 161 responsive to diagnostic test results. In other embodiments, shaft locking mechanism 166 may not communicate with the controller 12.

Optional electronic throttle 62 adjusts a position of throttle plate 64 to control air flow from air intake 42 to compressor 162 and intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example. It may be understood throughout the disclosure that reference to a catalyst is reference to an exhaust catalyst, such as included in converter 70. Converter 70 may be coupled downstream of the turbocharger turbine 164, and exhaust gas traveling from exhaust manifold 48 may pass through turbine 164 before reaching converter 70. In examples where a waste-gate 172 and a turbine bypass conduit 174 are included in the engine system in addition to a turbocharger, the converter 70 may be coupled downstream of both the turbocharger turbine 164 and the turbine bypass conduit 174. Further, in examples that include a waste-gate 172 and a turbine bypass conduit 174 in addition to the turbocharger turbine 164, exhaust gas traveling from an exhaust manifold 48 may first pass through the turbine bypass conduit 174 and/or the turbine 164 prior to traveling through converter 70.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may be a part of a control system 14. Control system 14 may further include sensors 16 and actuators 18 (various examples of which are described herein). Controller 12 of control system 14 is shown receiving various signals from sensors 18 coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a pressure sensor may be coupled to an oil pump to determine a pressure of the oil pump (not shown); a position sensor 154 coupled to brake pedal 150 for sensing force applied by foot 152, a measurement of engine manifold pressure (MAP) from pressure sensor 122 coupled to intake manifold 44; a measurement of turbine inlet gas pressure and/or exhaust gas pressure may be measured from a pressure sensor coupled near the turbine 164; an engine position sensor from a Hall effect sensor 118 sensing crankshaft 40 position; a measurement of air mass entering the engine from sensor 120; and a measurement of throttle position from sensor 58; a measurement of the turbine inlet gas pressure may be inferred from a pressure sensor coupled in the exhaust manifold. Barometric pressure may also be sensed (sensor not shown) for processing by controller 12. An engine position sensor 118 may produce a predetermined number of equally spaced pulses every revolution of the crankshaft from which engine speed (RPM) can be determined. A shaft position sensor may sense a rotational speed of shaft 161. Additionally, in some embodiments the controller 12 may receive signals from sensors of a shaft locking mechanism 166. For example, the controller 12 may receive signals from position sensors of the shaft locking mechanism 166. These position sensors may sense a position of an actuator of the shaft locking mechanism 166 or of a pin of the shaft locking mechanism 166. In some examples, the shaft locking mechanism 166 may also have a temperature sensor positioned therein. In other examples, a temperature of the shaft locking mechanism 166 may be based on one or more of an ECT, an output of temperature sensors coupled to catalytic converter 70, or an output of temperature sensors positioned in an exhaust passage 48. Position sensors may also be coupled to one or both of the compressor bypass valve 170 and the waste-gate 172 to provide signals to the controller 12 of their positions.

The controller 12 of control system 14 receives signals from the various sensors 16 of FIG. 1 and employs the various actuators 18 of FIG. 1 to adjust engine operation based on the received signals and instructions stored on a memory of the controller 12. For example, adjusting a shaft locking mechanism may include adjusting an actuator of a pin of the shaft locking mechanism. In another example, adjusting a position of the waste-gate 172 may include adjusting an actuator of the waste-gate 172.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Figure 2:
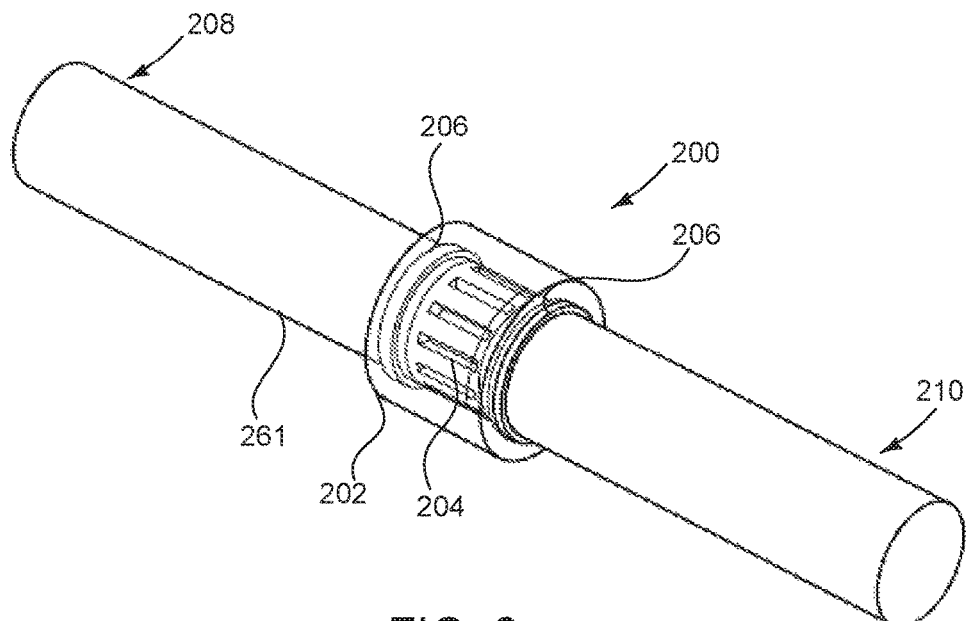
FIG. 2 shows a first view of a shaft locking mechanism according to a first embodiment.
Figure 3:
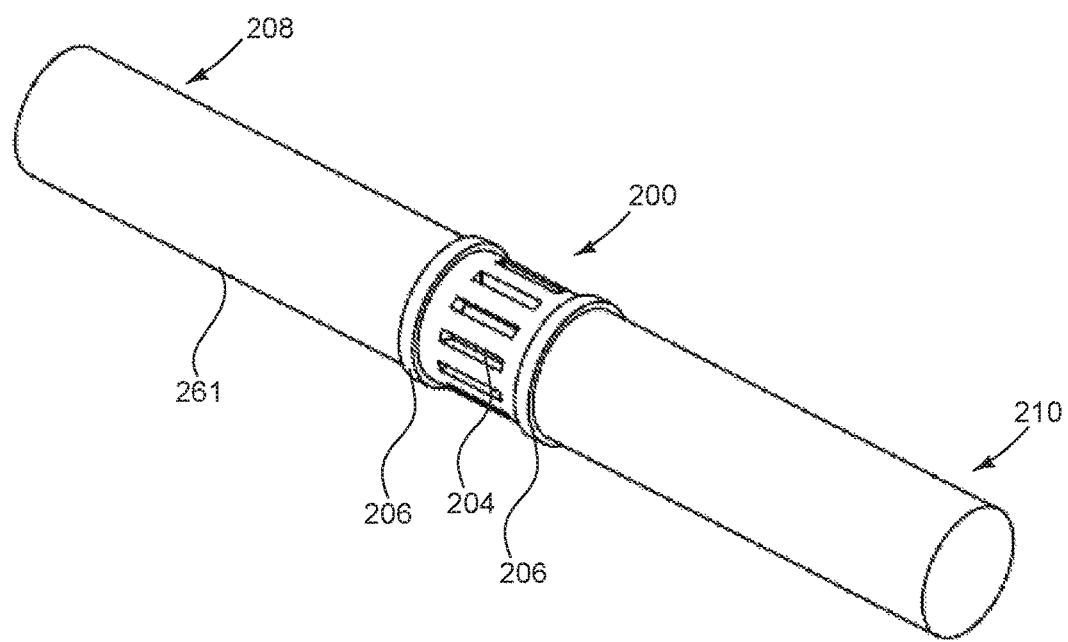
FIG. 3 shows a second view of the shaft locking mechanism according to the first embodiment.
Figure 4:
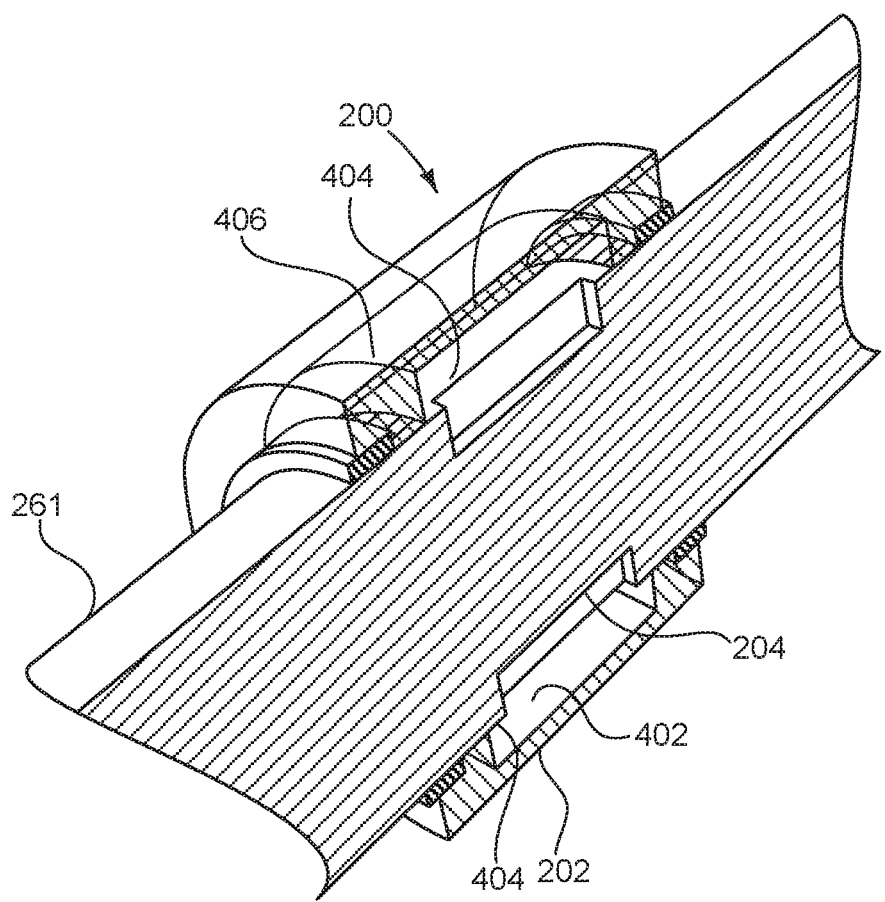
FIG. 4 shows a cut-away view of the shaft locking mechanism according to the first embodiment.

For purposes of discussion, FIGS. 2-4 will be described collectively. FIGS. 2-4 show various views of a shaft locking mechanism according to a first embodiment. Similar components that are introduced in a first figure may be numbered similarly in subsequent figures and not re-introduced.

FIG. 2 shows a first view of a shaft locking mechanism 200 according to a first embodiment. The shaft locking mechanism 200 may correspond to the shaft locking mechanism 166 described in FIG. 1. The shaft locking mechanism 200 may be a passive shaft locking mechanism of a turbocharger system and may include an outer casing 202 that surrounds at least a portion of a shaft 261 of a turbocharger system. In some examples, the shaft 261 may correspond to the shaft 161 described in FIG. 1. Though not shown, the shaft 261 may be rotationally coupled to a compressor at a first end 208 of the shaft and rotationally coupled to a turbine at a second end 210 of the shaft. The shaft 261 may be rotationally supported via the bearings 176 and 178 described in relation to FIG. 1. Further, though the shaft locking mechanism 200 is shown positioned approximately halfway between the first end 208 and the second end 210 of the shaft 261, other positioning of the shaft locking mechanism may be possible. For example, the shaft locking mechanism 200 may be positioned to contact a back disk of a turbocharger wheel of the turbocharger, where the back disk is a substantially flat, planar side of the turbine 164 or the compressor 162 opposite a side of the turbine 164 or compressor 162 that includes blades. In another example, the shaft locking mechanism 200 may be positioned to contact the rotating wheel blade structure. Different placement of the shaft locking mechanism may be beneficial for packaging constraints of different turbocharger systems.

The outer casing 202 may surround a portion of shaft 261, and the portion of the shaft 261 that the outer casing 202 surrounds may include a plurality of recesses, or slots, 204. The outer casing 202 may be fixed to a portion of the engine, so that the shaft 261 may rotate relative to the outer casing 202. In other words, the outer casing 202 may be fixed to a portion of the engine so that the shaft 261 may rotate within the outer casing 202. In some examples, the outer casing 202 may be fixed to an interior of a casing of the turbocharger system, where the outer casing 202 is surrounded by the turbocharger casing. The turbocharger casing may surround the shaft 261, the shaft locking mechanism 200, the turbine 164, and the compressor 162, and the turbocharger casing may be mounted to the engine, for example.

The recesses 204 may be integrated into the shaft 261, and the recesses 204 may be recessed relative to a base surface of the shaft 261. An enclosed cavity may be formed between the shaft 261 and recesses 204, and the outer casing 202. Put another way, there may be a cavity between the shaft 261 and the recesses 204 that are formed integrally with the shaft, and the outer casing 202. This cavity may be filled with a phase-transitioning material. In some examples, this phase-transitioning material may be a wax, such as wax pellets. The phase-transitioning material may surround shaft 261 and may be located within the recesses 204 of the shaft 261, between the exterior surface of shaft 261 and an interior surface of the outer casing 202.

The shaft locking mechanism 200 may directly contact the shaft 261, in some examples. In examples where the shaft locking mechanism 200 directly contacts the shaft 261, the shaft locking mechanism 200 may be referred to as a directly coupled shaft locking mechanism. In other words, in examples where the shaft locking mechanism 200 contacts the shaft 261 to couple the shaft 261 and the shaft locking mechanism 200 with no other component positioned there between, the shaft locking mechanism may be referred to as a directly coupled shaft locking mechanism.

In other examples, the shaft locking mechanism 200 may not directly contact the shaft 161 and may instead be indirectly coupled to the shaft 161. In examples where the shaft locking mechanism 200 is indirectly coupled to the shaft 261, the shaft locking mechanism 200 may be coupled to bearings that rotationally support the shaft 261. For example, the shaft locking mechanism 200 may be coupled to and directly contact the bearings 176 and 178 described in relation to FIG. 1 via annulus structures 206. In some examples, the shaft locking mechanism 200 may be directly coupled to a rotating portion of the bearings 176 and 178 (i.e., an inner race of the bearings, if the bearings are cartridge type bearings).

Annulus structures 206 may rotationally support the outer casing 202, so that the shaft 261 may rotate within the outer casing 202. In some examples, the annulus structures 206 may be bearings. The annulus structures 206 may be positioned between the outer casing 202 and the shaft 261, and the portion of the shaft locking mechanism 200 that includes the recesses 204 may be positioned between the annulus structures 206. The annulus structures 206 may directly or indirectly couple the outer casing 202 to the shaft 261. More specifically, the annulus structures 206 may rotationally couple the outer casing 202 to the shaft 261, and the shaft 261 may rotate relative to the casing 202. Further, the annulus structures 206 may form a seal between the outer casing 202 and the shaft 261. This seal formed by the annulus structures 206 may contain the phase-transitioning material in the cavity enclosed by the outer casing 202 as the phase-transitioning material melts.

In some examples, the phase-transitioning material may inhibit a shaft 261 from rotating. For example, the phase-transitioning material may be in a solid phase within the recesses 204, and against the inner surface of the outer casing 202, coupling the shaft 261 to the outer casing 202 and preventing rotation of the shaft 261. The phase-transitioning material may be solidified responsive to conditions where the phase-transitioning material may be less than a threshold temperature. Thus, even if exhaust gas flows through the turbine to which shaft 261 is attached, rotation of the shaft 261 may be inhibited, and in some examples may be stalled, if the phase-transitioning material is less than the threshold temperature. Inhibiting movement of the shaft 261 may be advantageous for reducing exhaust gas heat loss downstream of the turbocharger turbine during an engine cold-start by reducing or preventing spiraling of the exhaust gas downstream of the turbine. Reducing heat loss of the exhaust gas downstream of the turbocharger turbine during an engine cold-start may expedite a catalyst light-off, leading to reduced vehicle emissions.

The phase-transitioning material may decrease in viscosity responsive to the phase-transitioning material increasing in temperature. Exhaust gas may increase the temperature of the phase-transitioning material via heat transfer to the shaft 261 as the exhaust gas travels from the exhaust manifold to the catalyst. Additionally, ambient temperatures may also increase the temperature of the phase changing material. As a temperature of the phase-transitioning material within the cavity enclosed by outer casing 202 increases, the phase-transitioning material within the cavity may begin to transition from a solid phase to a liquid phase (i.e., melt). The phase-transitioning material may become less viscous as the temperature of the phase-transitioning material increases. This increase in temperature of the phase-transitioning material may be responsive to exhaust gas of the engine heating the shaft 261. The heat from the shaft 261 may then be transferred to the phase-transitioning material, increasing a temperature of the phase-transitioning material. The resistance to rotation of the shaft 261 decreases as the viscosity of the phase-transitioning material decreases, and the shaft 261 may begin to rotate responsive to the viscosity decreasing below a threshold viscosity.

In one example, responsive to the phase-transitioning material being greater than a threshold temperature, the viscosity of the phase-transitioning material may decrease below a threshold viscosity, and rotation of the shaft 261 may be enabled responsive to the phase-transitioning material being less than the threshold viscosity. The threshold temperature may be a melting point of the phase-transitioning material, for example. In some examples, the phase-transitioning material that fills the cavity of the shaft locking mechanism, including the recesses 204, may have a melting point temperature that is approximately the same as a catalyst light-off temperature. In other examples, however, the temperature of the phase-transitioning material may correspond to a temperature at which the catalyst may operate at a desired efficiency.

The threshold temperature of the phase-transitioning material being approximately the same as the temperature for the catalyst light-off or approximately the same as the temperature at which the catalyst may operate at a desired efficiency may have several advantages. For example, if the threshold temperature of the phase-transitioning material is approximately the same as the temperature for catalyst light-off, the phase-transitioning material may inhibit rotation of shaft 261 until catalyst light-off occurs, where inhibiting rotation of the shaft 261 includes stalling rotation of the shaft 261. Inhibiting rotation of the shaft 261 until catalyst light-off occurs may reduce heat loss from the exhaust gas to exhaust components, expediting heating of the catalyst to the light-off temperature. Similarly, if the threshold temperature of the phase-transitioning material is approximately the same as the temperature at which the catalyst operates at a desired efficiency, the phase-transitioning material may inhibit rotation of the shaft 261 until the catalyst reaches the temperature for the catalyst to operate at the desired efficiency, where inhibiting rotation of the shaft 261 includes stalling rotation of the shaft 261. Inhibiting rotation of the shaft 261 until the catalyst reaches a temperature for the catalyst to operate at the desired efficiency may expedite the heating of the catalyst to the desired efficiency.

FIG. 3 shows a second view of the shaft locking mechanism 200 according to the first embodiment. The second view of the shaft locking mechanism 200 according to the first embodiment is shown without the outer casing in order to better view some of the features of the shaft locking mechanism 200. For example, the annulus structures 206 and the recesses 204 may be more easily viewed in the second view provided at FIG. 3.

The annulus structures 206, as previously described, may rotationally support the outer casing of the shaft locking mechanism. The annulus structures 206 may be raised relative to a base surface of the shaft 261, and the annulus structures 206 may surround the shaft 261. The annulus structures 206 may be at a first end and a second end of the shaft locking mechanism 200, where a portion of the shaft locking mechanism 200 that includes the recesses 204 is positioned between the first end and the second end of the shaft locking mechanism.

The recesses 204 positioned between the first end and the second end of the shaft locking mechanism may be recessed relative to a base surface of the shaft 261. The recesses 204 may be rectangular in cross-section, in some examples. However, other cross-sectional shapes may be possible. For example, the recesses 204 may be rounded or triangular in cross-section. The recesses 204 may form cavities which the phase-transitioning material may fill. In some examples, the recesses 204 may be equally spaced around the shaft 261, and the recesses 204 may be uniform in size and shape. However, other arrangements for the recesses 204 may be possible. For example, the recesses 204 may vary in spacing around the shaft 261 or the recesses may not be uniform in size.

FIG. 4 shows a third view of the shaft locking mechanism 200 according to the first embodiment, where the third view is a cut-away view. This cut-away view may enable better viewing of the cavity between the outer casing, and the base surface of the shaft and the recesses. The cavity 406, which may be filled with phase-transitioning material as discussed above, is enclosed by the outer casing 202. In particular, the cavity 406 is enclosed between an inner surface 402 of the outer casing 202, and the base surface 404 and the recesses 204 of the shaft locking mechanism 200.

For purposes of discussion, FIG. 5 and FIG. 6 will be described collectively. Components in FIG. 6 that are similar to components described in FIG. 5 may be labeled similarly and not reintroduced in the description of FIG. 6.

FIG. 5 shows a shaft locking mechanism 500 according to a second embodiment in a first state. The first state shown is an unlocked state of the shaft locking mechanism 500. The shaft locking mechanism 500 may be an actively controlled shaft locking mechanism and may be controlled via a control system 14. The control system 14 may include sensors 16, a controller 12, and an actuator 518, and the control system 14 may correspond to the control system described in FIG. 1. For example, the sensors 16 and the controller 12 may correspond to the sensors and the controller as described in FIG. 1. The actuator 518 is an actuator of a pin 508 of the shaft locking mechanism 500 and may be one of the actuators 18 described in relation to FIG. 1.

The shaft locking mechanism 500 may share similar features with the shaft locking mechanism 200 described in FIGS. 2-4. For example, the shaft locking mechanism 500 may include annulus structures 506 which correspond to the annulus structures 206 of the shaft locking mechanism 200. Further, the shaft locking mechanism 500 may include a plurality of recesses 504 which correspond to the recesses 204 of the shaft locking mechanism. Further still, the shaft locking mechanism 500 may include a shaft 561, which corresponds to the shaft 261 described in relation to the shaft locking mechanism 200. The description for similar features highlighted between the shaft locking mechanism 500 and the shaft locking mechanism 200 (e.g., the annulus features 506, the recesses 504, and the shaft 561) may be shared. For example, the description in FIGS. 2-4 for the annulus features 206, the recesses 204, and the shaft 261 may apply to the annulus features 506, the recesses 504, and the shaft 561 of the shaft locking mechanism 500 described in FIGS. 5-6, respectively. Additionally, the shaft 561 described in relation to FIGS. 5 and 6 may also be supported by the bearings 176 and 178 described in FIG. 1 and in FIGS. 2-4. However, it is noted that as the shaft locking mechanism 500 does not include an outer casing, that the descriptions of the annulus features, the bearings (i.e., bearings 176 and 178), the recesses, and the shaft that are described in relation to an outer casing in FIGS. 2-4 do not apply to these features in FIGS. 5-6. Further, it is noted that for the shaft locking mechanism 500 that the bearings may be sealed within bearing cavities in order to separate the oil, sealed grease, or air mixture of the bearings from the pin 508 and the actuator 518 of the shaft locking mechanism 500. Sealing the lubricant of the bearings (e.g., the oil, sealed grease, or air) may be beneficial for preventing degradation of the pin 508 and the actuator 518, in some examples.

As mentioned above, the shaft locking mechanism 500 may be actively controlled via control system 14. In one example, the control system 14 may receive signals from sensors 16, then the controller may actuate the actuator 518 responsive to the signals received from the sensors 16. The sensors 16 may be any of the sensors described in relation to FIG. 1. For example, the sensors may be sensors that detect engine operating conditions. In some examples, the sensors 16 that detect conditions such as an engine speed, a catalyst temperature, a rotational speed of a turbocharger shaft, a temperature of the shaft locking mechanism, an exhaust gas pressure or turbine inlet pressure, or a position of the pin 508 of the shaft locking mechanism 500.

In some examples, one or more of the sensors 16 may be position sensors positioned on one or more of the shaft 561, the pin 508, and the actuator 518 of the shaft locking mechanism 500. The position of the shaft 561 may be based on a rotational speed of the shaft, while a position of the pin 508 and the actuator 518 may correspond to whether the pin 508 and the actuator 518 are in a position that would lock or unlock the shaft locking mechanism. Position sensors positioned on one or more of the pin 508, the shaft 561, and the actuator 518 may detect a position of these components of the shaft locking mechanism 500 and may produce outputs indicative of these positions to the controller 12. In some examples, one position sensor may be used to detect a position of more than one of the pin 508, the shaft 561, and the actuator 518. For example, a position sensor positioned on the actuator 518 may detect a position of the pin 508 and a rotational speed of the shaft 561. Other examples where one position sensor may be used to detect more than one component's position may also be possible. Based on the positions of one or more of the shaft 561, the pin 508, and the actuator 518, a state of the shaft locking mechanism 500 may be determined.

The actuator 518 may be an actuator of the pin 508 of the shaft locking mechanism 500. In some examples, the actuator 518 may be a solenoid actuator. In other examples, however, the actuator 518 may be a motor and gear actuator or a roller and pin actuator. The actuator 518 may control a position of the pin 508, where a first position of the pin 508 may unlock the shaft locking mechanism 500 and a second position of the pin 508 may lock the shaft locking mechanism.

The pin 508 is a structure that may fit within one of the recesses 504. In some examples, the pin 508 may be rectangular in shape. However, other shapes are possible. The pin 508 may fit within one of the recesses 504 so that at least a portion of the pin 508 may be surrounded by the recess 504. The pin 508 may be positioned within one of the recesses 504 via the actuator 518.

In some examples, the recesses 504 of the shaft locking mechanism 500 may be arranged to have less than a threshold distance between each recess 504 to more easily align the pin 508 and one of the recesses 504. For example, the threshold distance between each recess 504 may be a distance that requires less than a maximum of 45 degrees of rotation of the shaft 561 in order to align one of the recesses 504 with the pin 508. The pin 508 and a recess 504 may be aligned when the actuator 518 may position the pin 508 within a recess 504 without any additional rotation of the shaft 561. Thus, spacing recesses 504 less than a threshold distance apart may be advantageous for more quickly positioning of the pin 508 within one of the recesses 504, as less rotation of the shaft 561 may be required to align the pin 508 and one of the recesses 504.

In some examples, responsive to a request for the shaft locking mechanism 500 to be in the locked state, the actuator 518 may advance a position of the pin 508 towards the shaft 561 without taking into account alignment of the pin 508 and the recesses 504. In other words, regardless of whether the pin 508 is aligned with one of the recesses 504 or is aligned with the shaft base surface located between the recesses 504, the actuator 518 will advance the position of the pin 508 towards the shaft 561 responsive to a request for the shaft locking mechanism 500 to be in the locked state. If the pin 508 is not aligned with one of the recesses 504 when the actuator 518 advances the position of the pin 508 towards the shaft 561, the pin 508 may contact a base surface of the shaft 561 between two of the recesses 504. If a position of the pin 508 is advanced and the pin 508 comes into contact with a base surface of the shaft 561 instead of being positioned within one of the recesses 504, a position of the pin 508 may be adjusted to enable rotation of the shaft 561 until the pin 508 is aligned with one of the recesses 504. Then, when the pin 508 is aligned with one of the recesses 504, the actuator 518 may adjust the position of the pin 508, so that the pin 508 may be positioned with at least a portion of the pin fully surrounded by the recess 504. In other examples, however, the actuator 518 may not advance the position of the pin 508 relative to the shaft 561 until the pin 508 is aligned with a recess 504. The alignment of the pin 508 with the recesses 504 may be determined based on position sensor outputs for one or more of the shaft 561, the pin 508, and the actuator 518.

Controlling the position of the pin 508 may include retracting the pin 508 via the actuator 518 to disengage the pin 508 from one of the recesses 504. In this disengaged position, none of the recesses 504 may surround any portion of the pin 508. In examples where the pin 508 is in a disengaged position, the shaft 561 may rotate uninhibited by the shaft locking mechanism 500. Thus, a position of the pin 508 when the shaft locking mechanism is in an unlocked state may include a position where the pin 508 is disengaged from the recesses 504. The shaft locking mechanism 500 is shown disengaged, or in a retracted position, relative to the recesses 504 when the shaft locking mechanism is in the unlocked state, as shown in FIG. 5. Controlling the position of the pin 508 may also include positioning the pin 508 to be engaged with one of the recesses 504, which will be discussed in greater detail later.

FIG. 6 shows the shaft locking mechanism 500 according to the second embodiment in a second state. The second state may be a locked state of the shaft locking mechanism.

The shaft locking mechanism 500 may be transitioned into the locked state via controlling a position of the pin 508. Controlling the position of the pin 508 so that the shaft locking mechanism 500 is in the locked state may include advancing a position of the pin 508 so that the pin 508 may be engaged with one of the recesses 504. The pin 508 may be engaged with one of the recesses 504 by positioning the pin 508 via the actuator 518 to insert the pin 508 into one of the recesses 504. The pin 508 may be engaged with one of the recesses 504 when the pin 508 is at least partially surrounded by one of the recesses 504. Engagement of the pin 508 with one of the recesses 504 may stall (i.e., inhibit) rotation of the shaft 561. The shaft 561 may not rotate when stalled by engagement of the pin 508 with one of the recesses 504. Thus, the second state of the pin 508 to lock the shaft locking mechanism 500 may include advancing a position of the pin 508 towards the shaft 561 to engage the pin 508 with one of the recesses 504.

Positioning the pin 508 so that the shaft 561 may not rotate may be advantageous during conditions when a catalyst may be below a threshold temperature. For example, responsive to a catalyst temperature below a threshold temperature, rotation of the shaft 561 of may be prevented (i.e., stalled), as preventing rotation of the shaft 561 may reduce heat loss of exhaust gases downstream a turbine of the turbocharger and expedite heating of the catalyst, leading to reduced emissions.

Referring now to FIG. 7, an example flowchart of a method 700 for operating a turbocharger system is shown. Instructions for carrying out method 700 and the rest of the methods included herein may be executed by a controller based on instructions stored on a memory of the controller and in conjunction with signals received from sensors of the engine system, such as the sensors described above with reference to FIGS. 1-6. The controller may employ actuators of the engine system to adjust engine operation, including actuators of the turbocharger system, according to the methods described below. Further, for purposes of discussion numerical identifiers previously introduced in FIGS. 1-6 are numbered similarly and not reintroduced in the description for method 700 and the rest of the methods included herein.

Method 700 may start at 701. In some examples, method 700 may be initiated responsive to exceeding a threshold period of time since the method 700 last exited. At 702, engine operating conditions are determined. Engine operating conditions may include but are not limited to a temperature of the engine, atmospheric temperature and pressure, engine speed, engine load, time since engine start, number of combustion events since engine start, intake manifold pressure, desired engine torque, engine load, boost pressure, turbocharger shaft rotational speed, and throttle position. Other engine operating conditions may also include measured or inferred turbine inlet gas pressure or exhaust gas pressure. In examples where one or more of the turbine inlet gas pressure and exhaust gas pressure are measured, the pressures may be measured via pressure sensors located near the turbocharger turbine. In examples where one or more of the turbine inlet gas pressure and the exhaust gas pressure are inferred, the pressures may be inferred based on a temperature of the exhaust gas or based on a pressure sensor coupled to the exhaust manifold, for example. Other manners for inferring the turbine inlet pressure and the exhaust gas pressure may be possible and may take into account one or more of various temperature measurements, such as ECT or temperature sensor outputs throughout the engine, air flow rate, and various pressure measurements taken throughout the engine. Method 700 proceeds to 704 after engine operating conditions are determined.

At 704, method 700 determines a desired state of the shaft locking mechanism. The desired state of the shaft locking mechanism may include one of an unlocked state and a locked state. The desired state of the shaft locking mechanism may be the locked state responsive to locked state conditions. These locked state conditions may include one or more of engine cold start conditions, engine boost conditions exceeding a desired engine boost threshold, and an engine off condition. The desired state of the shaft locking mechanism may be the unlocked state responsive to unlocked state conditions. These unlocked state conditions may include one or more of completion of an engine warm-up and the presence of an overriding condition.

In examples where the desired state of the shaft locking mechanism is determined to be a locked state responsive to engine cold-start conditions, the engine cold-start conditions may include an engine temperature being less than a threshold temperature, in one example. The engine temperature may be estimated based on coolant temperature, for example. Engine cold-start conditions may additionally include or alternatively include conditions where a number of combustion events is less than the threshold number of combustion events since an engine start and before the next engine off condition, where there are no engine off conditions between the engine start and the next engine off condition. Further, engine cold-start conditions may additionally include or alternatively include conditions where a time period is less than a threshold time period since an engine start and before the next engine off condition, where there are no engine off conditions between the engine start and the next engine off conditions. In some examples, the engine cold-start conditions may additionally or alternatively include where an engine start follows a period of time exceeding a threshold period of time since a last engine combustion event.

Cold-start conditions may also include conditions where a catalyst temperature is less than a threshold temperature. The threshold temperature may be a light-off temperature of the catalyst, for example. In other examples, the threshold temperature may be a temperature at which the catalyst operates at a desired efficiency. Locking the shaft locking mechanism to inhibit movement of the shaft may be advantageous for reducing heat loss downstream of the turbocharger turbine during an engine cold-start, expediting heating of the catalyst.

In examples where the desired state of the shaft locking mechanism is determined to be a locked state responsive to engine boost conditions exceeding a desired boost level, locking the shaft may quickly reduce the boost level in the engine to the desired boost level. This may be advantageous for preventing issues such as knock, for example. In some examples, if the engine boost conditions exceed desired boost conditions, the shaft may be locked in combination with controlling a waste-gate to be in an open state. Opening the waste-gate when the shaft locking mechanism is in a locked state may reduce an amount of pressure applied to the pin of the shaft locking mechanism when the shaft locking mechanism is in the locked state. Reducing the amount of pressure applied to the pin of the shaft locking mechanism may prevent degradation of the shaft locking mechanism.

In examples where the desired state of the shaft locking mechanism is determined to be a locked state responsive to an engine off condition, the pin of the shaft locking mechanism may be immediately moved into an engaged position following the determination of the engine off condition. In other examples, however, the pin may be in an engaged position so that the shaft locking mechanism is in a locked state responsive to a rotational speed of the turbocharger shaft decreasing below a threshold speed following an engine off condition or responsive to a period of time exceeding a threshold period of time following an engine off condition. This threshold speed of the turbocharger shaft may be when rotation of the turbocharger shaft is stopped in some examples. In other examples, the threshold speed of the turbocharger shaft may be a speed at which it is determined the pin of the shaft locking mechanism may be actuated with reduced risk of damage to the pin.

In some examples, even if the shaft locking mechanism desired state is the locked state responsive to one or more of the above locked state conditions, this desired locked state may be overridden responsive to one or more overriding conditions. In other words, even if locked state conditions are present, the desired state of the shaft locking mechanism may be the unlocked state responsive to overriding conditions. These overriding conditions may include one or more of a turbine inlet gas pressure exceeding a threshold, exhaust gas pressure exceeding a threshold pressure, an accelerator pedal tip-in event, engine boost demand exceeding a threshold, detection of traffic conditions where high speeds are required, environmental conditions that degrade engine performance, and an engine load exceeding a threshold load. Overriding the desired shaft locking mechanism state from the locked state to the unlocked state responsive to these overriding conditions may be advantageous for avoiding degradation of engine performance.

In examples where the overriding condition present is a turbine inlet gas pressure or exhaust gas pressure greater than a threshold, the threshold pressure may be a predetermined pressure at which damage to the shaft locking mechanism may occur. In one example, the threshold pressure may be a predetermined pressure at which it is determined degradation to one or more of the pin and the actuator may occur. The rotating force on the shaft and thus the load imparted on the locking mechanism is directly proportional to the turbine inlet gas pressure. Therefore, it is beneficial to ensure there is a threshold on this pressure that is referenced when determining the desired locking position state. In this way, the system may request unlocking the shaft when the turbine inlet pressure exceeds some threshold providing protection to locking mechanism damage and shaft damage.

As another example, even if locked conditions are present, the desired state may be overridden from the locked state to the unlocked state responsive to an accelerator pedal tip-in overriding condition being present. As a more specific example, if engine cold-start conditions are present and the shaft locking mechanism is in the locked state, the shaft locking may be overridden to the unlocked position responsive to an accelerator tip-in event during the engine start.

In another example, even during locked state conditions, the desired state may be overridden to the unlocked state if an engine boost demand exceeds a threshold boost demand. In still another example, responsive to traffic conditions that may require the vehicle to travel at high speeds, such as highway speeds, the shaft locking mechanism desired state may be overridden from the locked state to the unlocked state. These traffic conditions may be detected through C2C or C2X communication in some examples. In other examples, traffic conditions may be determined via GPS navigational data and wirelessly accessed traffic information. Environmental conditions that may degrade engine performance may include low air density conditions (e.g., due to high elevation). These environmental conditions may be determined responsive to GPS navigational data. Lastly, the shaft locking mechanism desired state may be overridden from the locked state to the unlocked state during locked state conditions responsive to the engine load exceeding a threshold engine load.

Responsive to one or more of the above overriding conditions being present during locked state conditions, the shaft locking mechanism desired state may be overridden from the locked state to the unlocked state. Overriding the desired state of the shaft locking mechanism may result in the shaft locking mechanism being transitioned from the locked state to the unlocked state, even during engine cold-start conditions. In other words, even during locked state conditions where the shaft movement would normally be inhibited, responsive to one or more overriding conditions, the desired state may be overridden and shaft movement may be enabled. For example, during one or more locked state conditions a shaft locking mechanism may be in a locked state and inhibiting movement of the shaft, then responsive to one or more overriding conditions and during the locked state conditions, the shaft locking mechanism state may be transitioned to the unlocked state and movement of the shaft may be enabled. In some examples, transitioning the shaft locking mechanism from the locked state to the unlocked state responsive to overriding conditions may result in rotation of the turbocharger turbine prior to one or more of the catalyst temperature meeting the threshold temperature, the engine temperature reaching the temperature threshold, and the threshold number of combustion events since the engine start occurring.

For examples where the desired state of the shaft locking mechanism is determined to be the unlocked state responsive to the completion of the engine-warm up, the engine warm-up may be determined to be complete responsive to a catalyst temperature being greater than a threshold temperature, the threshold temperature may be a light-off temperature of the catalyst. In other examples, the threshold temperature may be a temperature at which the catalyst operates at a desired efficiency.

As another example, the engine warm-up may additionally or alternatively be determined as complete responsive to a number of combustion events since an engine start being greater than a threshold number of combustion events, where this number of combustion events may be since the engine start and before the next engine off condition.

As still another example, engine warm-up may additionally or alternatively be determined as complete responsive to a period of time since an engine start being is greater than a threshold period of time, where this period of time since the engine start is prior to the next engine off condition with no engine off conditions between the engine start and the next engine off condition.

Engine warm-up may additionally or alternatively be determined as complete responsive to a determination that sufficient oil flow is available to the bearings of the turbocharger. For example, sufficient oil flow may be determined as available to the bearings of the turbocharger responsive to a viscosity of turbocharger bearing oil being less than a threshold viscosity. In this way, the bearing and shaft hardware is protected from degradation due to premature rotation of the shaft prior to lubricating oil being available to protect the hardware. The viscosity of the turbocharger bearing oil may be based on an oil pump pressure that is less than a threshold pressure. An oil pump pressure less than a threshold pressure indicates that the oil viscosity has decreased.

The oil pump pressure may based on output from a pressure sensor of the oil pump, in some examples. In other examples, the turbocharger bearing oil viscosity may be inferred based on a temperature of the engine, where the engine temperature may be determined based on ECT or other temperature sensor outputs.

At 704, a current state of the shaft locking mechanism may be determined. The current state of the shaft locking mechanism may be based on position sensor outputs of the shaft locking mechanism in some examples. For example, if an engine is operating and a rotational speed of the turbocharger shaft is determined to be zero, then it may be determined that the shaft locking mechanism is in the locked state. On the other hand, if the engine is operating and the rotational speed of the turbocharger shaft is determined to be greater than zero, then it may be determined that the shaft locking mechanism is in the unlocked state. In other examples, the current state of the shaft locking mechanism may be based on the last confirmed state of the shaft locking mechanism.

At 706, the current state of the shaft locking mechanism may be compared to the desired state of the shaft locking mechanism. If the current state of the shaft locking mechanism is the same as the desired state of the shaft locking mechanism, then the method may proceed to 710 to maintain the current state of the shaft locking mechanism.

For example, if the desired state of the shaft locking mechanism is a locked state and the current state of the shaft locking mechanism is the locked state, then the shaft locking mechanism may be maintained in the locked state at 710. In other examples, if the desired state of the shaft locking mechanism is the unlocked state and the current state of the shaft locking mechanism is the unlocked state, then the shaft locking mechanism may be maintained in the unlocked state at 710. Similarly, if the desired state of the shaft locking mechanism is the locked state and the current state of the shaft locking mechanism is the locked state, then the shaft locking mechanism may be maintained in the locked state at 710. Following step 710, the method may exit at 718.

If the current state of the shaft locking mechanism is different than the desired state of the shaft locking mechanism, then the method may proceed to 712 to change the state of the shaft locking mechanism. Put another way, if the current state of the shaft locking mechanism is different than the desired state of the shaft locking mechanism, then the state of the shaft locking mechanism may be changed from the current position to the desired position.

For example, if the current state of the shaft locking mechanism is the locked state and the desired state of the shaft locking mechanism is the unlocked state, then the shaft locking mechanism may be changed from the locked state to the unlocked state. In another example, if the current state of the shaft locking mechanism is the unlocked state and the desired state of the shaft locking mechanism is the locked state, then the shaft locking mechanism may be changed from the unlocked state to the locked state.

The state of the shaft locking mechanism may be transitioned between the locked and unlocked states by positioning of a pin of the shaft locking mechanism as described in FIGS. 5-6.

Following changing the state of the shaft locking mechanism at 712, the method may include confirming whether the state of the shaft locking mechanism successfully changed at 714. The change in state of the shaft locking mechanism may be confirmed to be successful responsive to an output of position sensors of the shaft locking mechanism as described in FIGS. 5-6 in some examples.

If the change in state of the shaft locking mechanism is confirmed to be successful at 712, then the method may exit at 718.

If the change in state of the shaft locking mechanism is unsuccessful according to 712, the method may include providing an indication of shaft locking mechanism degradation at 720. An indication of shaft locking mechanism degradation may be provided by illuminating an indicator light in some examples. Further, responsive to determining an unsuccessful change in state of the shaft locking mechanism, mitigating actions may be performed at 720. These mitigating actions will be described in more detail at FIG. 8. Following 720, the method may exit at 718.

Referring now to FIG. 8, an example flowchart of a method 800 for performing mitigating action for a turbocharger system is shown. The method 800 may be performed as a part of 720 from method 700, responsive to determining that changing the state of the shaft locking mechanism was unsuccessful.

Method 800 may start at 801, responsive to determination of an unsuccessful change in state at 712. At 802, method 800 includes determining if the shaft locking mechanism is stuck in the locked state. For example, the shaft locking mechanism may be determined as stuck in the locked state responsive to unsuccessfully transitioning the shaft locking mechanism from the locked state to the unlocked state.

If the shaft locking mechanism is determined to be stuck in the locked state, then at 804 a waste-gate may be opened. In some examples, the waste-gate may be fully opened. Opening the waste-gate when the shaft locking mechanism is stuck in a locked state may reduce an amount of pressure that the pin of the shaft locking mechanism receives by diverting exhaust air to bypass the turbine of the turbocharger. Reducing the amount of pressure that the pin receives while the shaft locking mechanism is stuck in a locked state may prevent further degradation of the pin. The waste-gate may be maintained in the open position at 804 and then method 800 may end at 812.

At 812, the method may proceed to 718 of method 700 and exit. The waste-gate may be maintained in the open position following 804 until the state of the shaft locking mechanism successfully changes at 714 in some examples.

If the shaft locking mechanism is not stuck in the locked state, it may be determined at 802 the shaft locking mechanism may be stuck in the unlocked state. Responsive to determining that the shaft locking mechanism is not stuck in the locked state at 802 (i.e., determining that the shaft locking mechanism is stuck in the unlocked state), at 806 the waste-gate may be opened.

Because an unsuccessful change in the state of the shaft locking mechanism has resulted in the shaft locking mechanism not being able to transition to the locked position at 806, the desired state of the shaft locking mechanism is in the locked position at 806. As the desired state of the shaft locking mechanism is the locked state, which inhibits rotation of the turbocharger shaft, and the shaft locking mechanism is stuck in the unlocked state at 806, method 800 may include opening the waste-gate. In some examples the waste-gate may be fully opened or approximately fully opened. Opening the waste-gate to a fully opened or an approximately fully opened position when the shaft locking mechanism is stuck in an open position may divert exhaust gas to bypass the turbine of the turbocharger, reducing a rotational speed of the turbocharger shaft. In some examples, such as during an engine warm-up, inhibiting rotation of the turbocharger shaft may expedite the warm-up of the catalyst and reduce emissions.

At 808, it is determined whether a temperature of the catalyst is greater than a threshold temperature. The threshold temperature may be a light-off temperature of the catalyst in some examples. In other examples, the threshold temperature may be a temperature at which the catalyst operates at a desired efficiency. If the temperature of the catalyst is less than the threshold temperature, then the method may go back to 806 and continue to maintain the waste-gate in the fully open or approximately fully open state.

If the temperature of the catalyst is greater than the threshold, then at 810 the waste-gate may be positioned based on a comparison of a desired engine boost and a current engine boost. The desired engine boost and the current engine boost conditions may be determined based on one or more of pressure sensor output from a pressure sensor positioned at a turbocharger compressor inlet and a turbocharger shaft speed, in some examples. If the desired engine boost is greater than the current engine boost, then the waste-gate may be positioned to a less open position in order to increase an amount of exhaust gas rotating the turbine of the turbocharger, thus increasing engine boost. In other examples, if the desired engine boost is less than the current engine boost, and the waste-gate is not in a fully opened positioned, then waste-gate may be positioned to a more open position in order to reduce an amount of exhaust gas rotating the turbine of the turbocharger. Positioning the waste-gate to a more open position may reduce an amount of exhaust gas rotating the turbine of the turbocharger, thus reducing engine boost.

The desired engine boost may be based on current engine operating conditions such as one or more of accelerator pedal position, engine load, and detection of engine knock. For example, responsive to accelerator pedal tip-in, a desired engine boost may be increased, and responsive to one or more of an accelerator pedal release and depression of a brake pedal, a desired engine boost may be decreased. An amount of desired engine boost may also be increased responsive to an increase in engine load and desired engine boost may be decreased responsive to a decrease in engine load. A desired engine boost may also be decreased responsive to detection of engine knock.

In some examples, positioning the waste-gate responsive to a comparison of the desired engine boost and current engine boost may include positioning the waste-gate to an approximately closed or a fully closed position until a desired engine boost demand is met. Following positioning of the waste-gate at 810, the method may continue to 812. At 812, method 800 may proceed to 718 of method 700 and exit.

Figure 9:
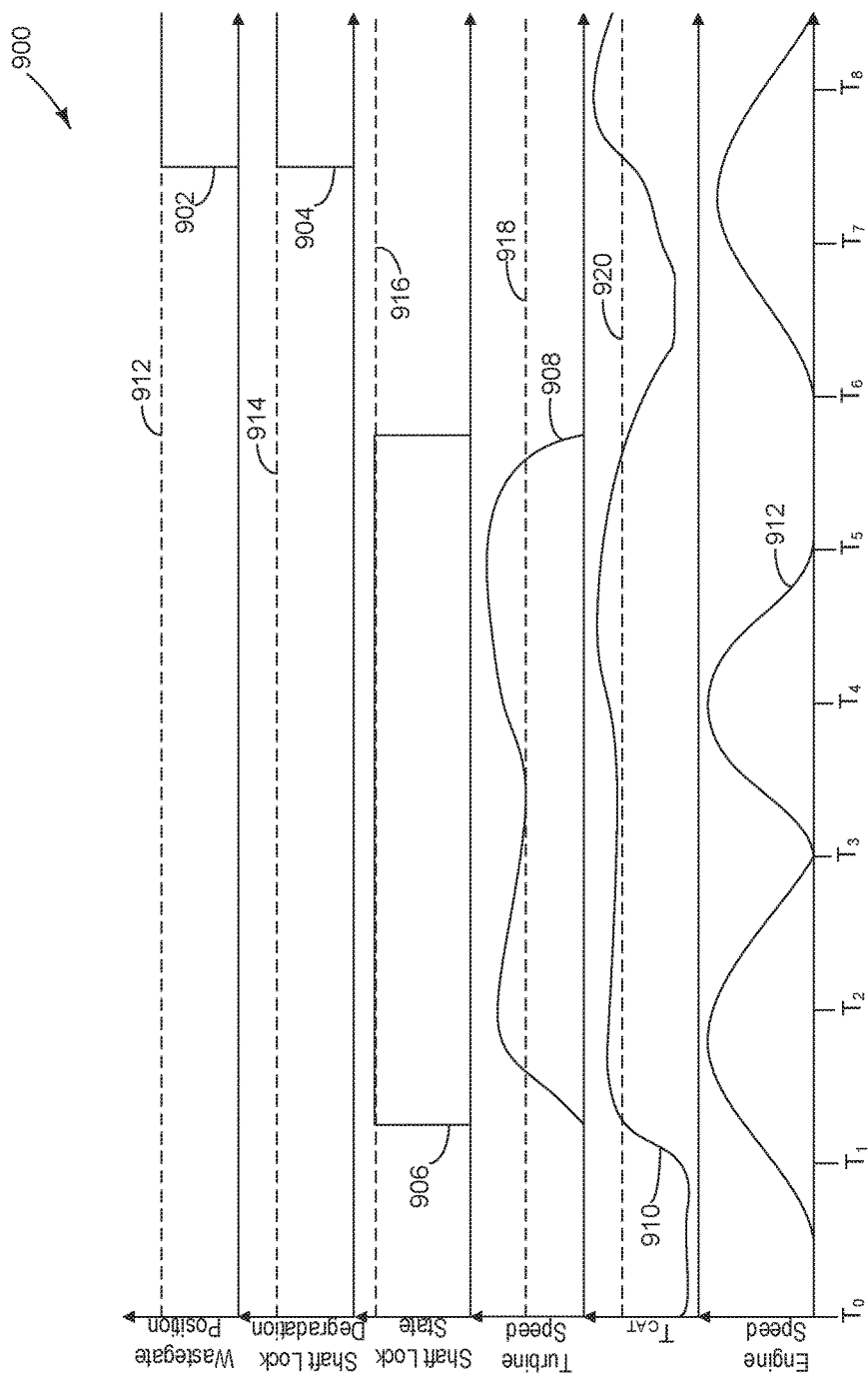
FIG. 9 shows a graphical representation of an example relationship between a waste-gate position, shaft locking mechanism, turbine speed, temperature of a catalyst ($T_{CAT}$), and engine speed.

Turning now to FIG. 9, a graphical representation 900 of an example relationship between a waste-gate position, shaft locking mechanism, turbine speed, temperature of a catalyst ($T_{CAT}$), and engine speed.

This graphical representation may correspond to the arrangements shown in FIG. 1 and FIGS. 5 to 6.

The X-axis of the graphical representation represents time, where time increases in the direction of the X-axis arrow. The Y-axis of the top plot represents a waste-gate position. The Y-axes for the remaining plots represent whether degradation of the shaft locking device is present, a state of the shaft locking device, a turbine speed, a temperature of a catalyst ($T_{CAT}$), and an engine speed.

The waste-gate position 902 may be fully open or substantially open at threshold 912 and may be fully closed or substantially closed at the X-axis of the waste-gate position plot.

Shaft locking device degradation 904 may be present at threshold 914 and may not be present at the X-axis of the shaft lock degradation plot.

The shaft locking device state 906 may be unlocked at threshold 916 and may not be present at the X-axis of the shaft lock state plot.

Turbine speed 908 is represented as increasing in the same direction as the Y-axis arrow of the turbine speed plot, where the turbine speed 908 corresponds with a rotational speed of the turbocharger shaft. A threshold turbine speed 918 may be a rotational speed of the turbocharger shaft that is used to determine whether or not to transition the shaft locking mechanism from an unlocked state to a locked state. For example, if a turbine speed 908 exceeds the threshold turbine speed 918, then the shaft locking mechanism may not be transitioned to the locked state to avoid damage to a pin and/or an actuator of the shaft locking mechanism. In another example, if the turbine speed 909 is less than the threshold speed, and the desired state of the shaft locking mechanism is the locked state, then the shaft locking mechanism may be transitioned to the locked state.

In the graphical representation 900, the threshold turbine speed 918 is greater than zero. That is, in the graphical representation 900, at the threshold turbine speed 918 the shaft of the turbocharger is still rotating. In other examples, however, the threshold turbine speed 918 may be zero, so that the shaft of the turbocharger is stopped and no longer rotating when the shaft locking mechanism is transitioned to the locked state.

In examples where the threshold turbine speed is zero, the rotation of the turbocharger shaft is stopped and no longer rotating, and the risk of damage to the pin of the shaft locking mechanism is reduced compared to examples where the turbocharger shaft may be rotating at high speeds.

The temperature of the catalyst ($T_{CAT}$) 910 is represented as increasing in the same direction as the Y-axis arrow of the $T_{CAT}$ plot. Threshold 920 may represent a temperature threshold of the catalyst. In some examples, the temperature threshold may be a light-off temperature of the catalyst. In other examples, the temperature threshold may be a predetermined temperature at which an engine warm-up is considered complete. In still other examples, the temperature threshold may be a temperature at which the catalyst operates at a desired efficiency.

The speed of the engine 912 is represented as increasing in the same direction as the Y-axis arrow of the engine speed plot.

At time $T_0$, an engine speed may be zero. The engine speed may be zero responsive to an engine off condition. In some examples, the engine may have been in an off condition at $T_0$ for a long enough period of time since a last engine on condition to allow a temperature of the catalyst 910 to return from above the threshold catalyst temperature 920 to approximately an ambient temperature. The temperature of the catalyst 910 may be less than the threshold temperature of the catalyst 920 at $T_0$. Additionally at $T_0$, the waste-gate may be closed, a shaft locking device may be functional, and the shaft locking device may be in a locked state.

Between $T_0$ and $T_1$, an engine speed may increase above zero. The engine speed may increase responsive to a command to transition the engine from an engine off condition to an engine on condition. The shaft lock may be maintained in a closed position at $T_1$ and a temperature of the catalyst 910 may begin to increase. The temperature of the catalyst 910 may increase due to exhaust gases flowing through the catalyst as the engine speed increases.

Between $T_1$ and $T_2$, the engine speed 912 increases until shortly before $T_2$, and then the engine speed 912 begins to decrease. Shortly after $T_1$ the temperature of the catalyst 910 exceeds the catalyst temperature threshold 920. Responsive to the temperature of the catalyst 910 exceeding the catalyst temperature threshold 920, the shaft locking mechanism may be transitioned from a locked state to an unlocked state. The turbine speed 908 begins to increase following the transition of the shaft locking mechanism from the locked state to the unlocked state.

Between $T_2$ and $T_3$, the engine speed 912 continues to decrease. Additionally, the turbine speed 908 and the temperature of the catalyst 910 begin to decrease. The shaft locking mechanism is maintained in an unlocked state between $T_2$ and $T_3$.

At time $T_3$, the engine speed 912 may be at zero. The engine speed 912 may be at zero responsive to a request for an engine off condition, for example. The temperature of the catalyst 920 decreases responsive to the engine speed 912 decreasing to zero. Additionally a turbine speed 908 also decreases. The shaft locking mechanism state 906 remains in an unlocked state at $T_3$, due to the temperature of the catalyst 910 remaining above a catalyst temperature threshold 920 and due to the turbine speed 908 remaining above the threshold turbine speed 918.

Between $T_3$ and $T_4$, the engine speed 912 begins to increase. The engine speed 912 may increase responsive to a request for an engine on condition. The temperature of the catalyst 910 and the turbine speed 908 also increase. The shaft locking mechanism is maintained in an unlocked state.

Between $T_4$ and $T_5$, the engine speed 912 begins to decrease. Additionally, the turbine speed 908 and the temperature of the catalyst 910 also begin to decrease. The shaft locking mechanism maintained in an unlocked state.

At $T_5$, the engine speed 912 decreases to zero. The engine speed 912 may decrease to zero responsive to an engine off request.

Between $T_5$ and $T_6$, the engine speed 912 remains at zero. Additionally, between $T_5$ and $T_6$ the turbine speed 908 decreases below the threshold turbine speed 918, and the temperature of the catalyst 910 decreases below the threshold catalyst temperature 920. Responsive to the temperature of the catalyst 910 decreasing below the catalyst temperature threshold 920 and the turbine speed 908 decreasing below the turbine threshold speed 918, the shaft locking mechanism state may be transitioned from the unlocked state to the locked state. However, in some examples, the shaft locking mechanism may be transitioned between the locked state and the unlocked state responsive to the temperature of the catalyst 910 and may not take into account the turbine speed 908.

At $T_6$, the engine speed 912 begins to increase. In some examples, the engine speed 912 may increase responsive to a request for an engine on condition.

Between $T_6$ and $T_7$, the engine speed 912 continues to increase and the temperature of the catalyst 910 also increases. Additionally, the shaft locking mechanism is maintained in the locked state, and thus, the turbine speed 908 remains at zero.

Between $T_7$ and $T_8$, the catalyst temperature 910 increases above the catalyst temperature threshold 920. Responsive to the catalyst temperature 910 increasing above the catalyst temperature threshold 920, the shaft locking mechanism is commanded to transition from the locked state to the unlocked state. However, the change in state of the shaft locking mechanism is unsuccessful; therefore, shaft lock degradation is indicated. The waste-gate position 902 may be positioned from a closed position to an open position 912.

Positioning the waste-gate from a closed position to an open position may prevent additional pressure from being applied to the pin of the shaft locking mechanism, as the shaft locking mechanism is stuck in the closed state, and the pin may be in an engaged position with the recesses of the shaft locking mechanism. Following $T_8$, the engine speed 912 decreases and the temperature of the catalyst 910 also begins to decrease.

Thus, provided is a system and method for controlling a turbocharger. A first example system described for controlling a turbocharger may include a shaft rotationally coupled to a turbine and a compressor of a turbocharger, and a shaft locking mechanism that inhibits movement of the shaft responsive to a first set of engine operating conditions. In some examples, the first set of engine operating conditions may be engine cold-start conditions. The shaft locking mechanism may be referred to as being in a locked state when the shaft locking mechanism is in a state to inhibit movement of the shaft and as being in an unlocked state when the shaft locking mechanism is in a state to enable movement of the shaft.

A second example of the system optionally includes the first example and further includes wherein the shaft locking mechanism enables movement of the shaft responsive to a second set of engine operating conditions. A third example of the system optionally includes the first and second examples, and further includes wherein the shaft locking mechanism is a passive shaft locking mechanism. In such examples, the passive shaft locking mechanism may include a phase-transitioning material, such as a wax, that surrounds the shaft and is within recesses of the shaft. In some examples, the phase-transitioning material may be located between an outer casing and the shaft, where the outer casing is coupled to the shaft and surrounds at least a portion of the shaft. The phase-transitioning material of the passive shaft locking mechanism may transition from a solidified state to a liquid state responsive to the second set of operating conditions described in the second example of the system, and movement of the shaft may be enabled once the phase-transitioning material has transitioned from a solidified state to a liquid state. Further, the passive shaft locking mechanism may inhibit movement of the shaft via solidification of the phase-transitioning material. In other words, the phase-transitioning material of the shaft locking mechanism inhibits movement of the shaft when it is in a solidified state.

In a fourth example of the shaft locking mechanism that optionally includes the first example, the shaft locking mechanism may be an active shaft locking mechanism. In such examples where the shaft locking mechanism is an active shaft locking mechanism, the active shaft locking mechanism may include a pin that fits within a slot of the shaft. The pin of the active shaft locking mechanism may be positioned within the slot of the shaft to inhibit movement of the shaft.

In a first example of the method, responsive to engine cold-start conditions, movement of a shaft of a turbocharger may be inhibited via a shaft locking mechanism. A second example of the method optionally includes the first example and further includes, if a turbine inlet pressure is greater than a threshold pressure, enabling movement of the shaft even during the cold-start conditions of the engine. Enabling movement of the shaft even during the cold-start conditions of the engine responsive to an inlet pressure that is greater than a threshold pressure may prevent damage to the shaft locking mechanism. In some examples, turbine movement may be enabled responsive even during the cold-start conditions of the engine responsive to any one or more of the overriding conditions discussed in relation to FIG. 7, for example.

A third example of the method that optionally includes the first and second example methods further includes, responsive to a second set of engine operating conditions, enabling movement of the shaft. The second set of engine operating conditions may include one or more of a viscosity of turbocharger bearing oil that is less than a threshold viscosity and a catalyst temperature that is greater than a threshold temperature. However, the second set of engine operating conditions may include any one or more of the conditions indicating completion of an engine warm-up as discussed in relation to FIG. 7.

A fourth example of the method optionally includes one or more of the first through third example methods, and further includes adjusting a waste-gate position responsive to degradation of the shaft locking mechanism. Adjusting the waste-gate position responsive to degradation of the shaft locking mechanism may be advantageous for preventing damage to the shaft locking mechanism and for meeting engine operating requests (e.g., desired boost). Degradation of the shaft locking mechanism may include the shaft locking mechanism being stuck in a locked state. In other examples, degradation of the shaft locking mechanism may include the shaft locking mechanism being stuck in the unlocked state.

A fifth example of the method optionally includes one or more of the first through the fourth example methods, and further includes adjusting the waste-gate to an open position responsive to the shaft locking mechanism being stuck in the locked state. The waste-gate may be fully opened or approximately fully opened, in some examples. In other examples, however, the waste-gate may be only opened enough to reduce a pressure placed on the shaft locking mechanism to less than a threshold pressure. Opening the waste-gate may avoid or reduce damage to the shaft locking mechanism by reducing an amount of exhaust gas flow through the turbine of the turbocharger, thus reducing an amount of pressure put on the shaft locking mechanism stuck in the locked state. In some examples when the shaft locking mechanism is stuck in the locked state, the waste-gate may be maintained in an open position until the shaft locking mechanism is determined to no longer be stuck in the locked state.

A sixth example of the method optionally includes one or more of the first through fifth example methods, and further includes adjusting the shaft locking mechanism to an open position responsive to the shaft locking mechanism being stuck in the unlocked state until a temperature of a catalyst is greater than a threshold temperature. This may be advantageous for expediting catalyst light-off by reducing swirl and thus residency time of exhaust gas in the exhaust system before the exhaust gas reaches the catalyst, even though the shaft locking mechanism is unable to prevent rotation of the turbocharger.

A seventh example of the method, which optionally includes one or more of the first through the sixth example methods, further comprises positioning the waste-gate responsive to a comparison of a desired engine boost and a current engine boost if the shaft locking mechanism is stuck in the unlocked state and the catalyst is greater than a threshold temperature. If this seventh example of the method includes the sixth example of the method, then positioning of the waste-gate in the seventh example method is a re-positioning of the waste-gate from an open position (e.g., fully open or approximately fully open position) to a position responsive to a comparison of a desired engine boost and a current engine boost. Positioning the waste-gate responsive to a comparison of the desired engine boost and a current engine boost when the shaft locking mechanism is stuck open and the catalyst is greater than a threshold temperature may be advantageous for meeting engine operating requirements. The threshold temperature of the catalyst may be a catalyst light-off temperature or a temperature at which the catalyst operates at a desired efficiency, for example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A turbocharger system, comprising:
   a shaft rotationally coupled to a turbine and a compressor; and a shaft locking mechanism that inhibits movement of the shaft responsive to engine cold-start conditions, wherein the shaft locking mechanism is a passive shaft locking mechanism, and wherein the passive shaft locking mechanism includes a phase-transitioning material that surrounds the shaft and is within recesses of the shaft.

2. The system of claim 1, wherein the passive shaft locking mechanism inhibits movement of the shaft via solidification of the phase-transitioning material.

3. A method for expediting catalyst light-off, comprising:
determining engine operating conditions;
responsive to a first set of the engine operating conditions including cold-start conditions of the engine, inhibiting movement of a shaft of a turbocharger via a shaft locking mechanism controlled by an electronic controller of the engine, the shaft being coupled to a turbine rotor which is positioned in an exhaust stream of the engine; and
if a turbine inlet pressure is greater than a threshold pressure, enabling movement of the shaft, even during the cold-start conditions of the engine.

4. The method of claim 3, further comprising responsive to a first set of engine operating conditions, enabling movement of the shaft.

5. The method of claim 4, wherein the first set of engine operating conditions includes a viscosity of turbocharger bearing oil that is less than a threshold viscosity.

6. The method of claim 4, wherein the first set of engine operating conditions includes a catalyst temperature that is greater than a threshold temperature.

7. The method of claim 3, further comprising, responsive to degradation of the shaft locking mechanism, adjusting a waste-gate position.

8. The method of claim 7, wherein degradation of the shaft locking mechanism includes the shaft locking mechanism being stuck in a locked state, and wherein the waste-gate position is adjusted to an open position responsive to the shaft locking mechanism being stuck in the locked state.

9. The method of claim 7, wherein degradation of the shaft locking mechanism includes the shaft locking mechanism being stuck in an unlocked state, and wherein the waste-gate position is adjusted to an open position responsive to the shaft locking mechanism being stuck in the unlocked state until a temperature of a catalyst is greater than a threshold temperature.

10. The method of claim 9, further comprising positioning the waste-gate responsive to a comparison of a desired engine boost and a current engine boost when the shaft locking mechanism is stuck in the unlocked state and the catalyst is greater than the threshold temperature.

11. A method for expediting catalyst light-off, comprising:
determining engine operating conditions;
responsive to a first set of engine operating conditions including cold-start conditions of an engine, inhibiting movement of a shaft of a turbocharger via a shaft locking mechanism controlled by an electronic controller of the engine, the shaft being coupled to a turbine rotor which is positioned in an exhaust stream of the engine; and
responsive to degradation of the shaft locking mechanism, adjusting a waste-gate position.

12. A method for expediting catalyst light-off, comprising:
determining engine operating conditions;
responsive to a first set of engine operating conditions including cold-start conditions of an engine, inhibiting movement of a shaft of a turbocharger via a shaft locking mechanism, the shaft being coupled to a turbine rotor which is positioned in an exhaust stream of the engine; and
responsive to degradation of the shaft locking mechanism, adjusting a waste-gate position, wherein the shaft locking mechanism is an active shaft locking mechanism controlled by an electronic controller of the engine.

13. The method of claim 12, wherein the active shaft locking mechanism includes a pin that fits within a slot of the shaft.

14. The method of claim 13, wherein the pin of the active shaft locking mechanism is positioned within the slot of the shaft to inhibit movement of the shaft.

* * * * *